(12) United States Patent
Kraemer et al.

(10) Patent No.: US 9,864,764 B2
(45) Date of Patent: Jan. 9, 2018

(54) EVOLVING DATA ARCHIVES

(71) Applicant: Accenture Global Solutions Limited, Dublin (IE)

(72) Inventors: Eric Justin Kraemer, Aliso Viejo, CA (US); Eric Tristan Lemoine, San Marcos, CA (US)

(73) Assignee: Accenture Global Solutions Limited, Dublin (IE)

(*) Notice: Subject to any disclaimer, the term of this patent is extended or adjusted under 35 U.S.C. 154(b) by 293 days.

(21) Appl. No.: 14/473,851

(22) Filed: Aug. 29, 2014

(65) Prior Publication Data
US 2016/0063040 A1    Mar. 3, 2016

(51) Int. Cl.
*G06F 17/30* (2006.01)

(52) U.S. Cl.
CPC .. *G06F 17/30297* (2013.01); *G06F 17/30073* (2013.01); *G06F 17/30371* (2013.01)

(58) Field of Classification Search
CPC ................ G06F 17/30194; G06F 17/30073
See application file for complete search history.

(56) References Cited

U.S. PATENT DOCUMENTS

| | | | |
|---|---|---|---|
| 5,983,218 A * | 11/1999 | Syeda-Mahmood | G06F 17/30893 707/711 |
| 6,381,600 B1 * | 4/2002 | Lau | G06F 17/30595 |
| 8,631,154 B2 | 1/2014 | Bartfai-Walcott | |
| 8,953,218 B2 | 2/2015 | Hartupee, Jr. et al. | |
| 2003/0154216 A1 * | 8/2003 | Arnold | G06F 17/30292 |
| 2006/0059127 A1 | 3/2006 | Berry | |
| 2007/0294266 A1 | 12/2007 | Chowdhary | |
| 2007/0299810 A1 * | 12/2007 | Riedel | G06F 17/30306 |
| 2009/0106149 A1 | 4/2009 | Bennett | |
| 2010/0114843 A1 * | 5/2010 | Farrar | G06F 17/30336 707/693 |
| 2011/0282872 A1 | 11/2011 | Oksman | |
| 2012/0296743 A1 | 11/2012 | Velipasaoglu | |
| 2014/0095469 A1 * | 4/2014 | Chen | G06F 17/30466 707/714 |

FOREIGN PATENT DOCUMENTS

WO    200169860 A2    9/2001

\* cited by examiner

*Primary Examiner* — Hung Q Pham
(74) *Attorney, Agent, or Firm* — Fish & Richardson P.C.

(57) ABSTRACT

A data archive constructed from source data, whose structure and associated schemas can evolve based on the generated responses to user data requests. Based on the analysis of the responses, the schema and/or archive structure can be modified to provide greater knowledge, definition and operations available to be performed on the data, as well as to reduce the processing and storage costs associated with housing and accessing the data within the archive.

19 Claims, 4 Drawing Sheets

EVOLVING DATA ARCHIVES

FIELD OF THE INVENTION

The field of the invention is data access and storage technologies.

BACKGROUND

The background description includes information that may be useful in understanding the present invention. It is not an admission that any of the information provided herein is prior art or relevant to the presently claimed invention, or that any publication specifically or implicitly referenced is prior art.

The evolution of computing and networking technologies have made data collection, storage, and analysis increasingly easier to perform, and at a continuously larger scale. The ever-decreasing size of network-capable computing devices have increased the number of data sources gathering or creating data, the types of data available from these sources, and the overall amount of data available. Likewise, advancements in data communications and storage technologies have enabled entities interested in data from these sources to collect increasingly larger amounts of data in databases or other data stores. This exponential growth in digitized data generation and collection continues to be fueled by machine generated data in provenance of devices such as sensors and probes that can monitor, measure and assert health, behavior, state, environment and performance of many types of machines and man-made systems, as well as humans and many aspects of the natural world.

The collection of data on such a scale allows for analysis that can result in discoveries and advancements, across various fields of study, which were not previously possible. For example, a medical researcher can use medical information gathered by wearable devices or sensors outside of a hospital setting to analyze health or medical patterns across a population. In another example, an advertiser can use online behaviors of a population of users to determine product trends, interests and advertisement effectiveness within a population.

However, certain data generating devices such as sensors or probes are capable of generating data flows that, while digital, reflect their analog nature (and moreover, is often non-linear) or simply cannot be classified as symbolic and human-readable.

To explore, discover and extract pertinent information out of these new data flows, an incremental process is required that allows for starting at a state where very little is known about the data, and provides for development towards a full data model at both the data consumption side and also at the data repository level. The complexity of this task requires methods far beyond simple numeric comparison and/or textual search. For example, signal data, instead of processing it before it is stored (resulting in loss of information), should be stored as it is and signal processing techniques (e.g. FFT) then be used to extract a relevant view of the signal. This process is recursive in nature and, as such, deciding the meaning of data (e.g., classifying, categorizing, segmenting, etc.) a priori cannot be performed.

Adding to this the rapidly widening gap between digital data production capabilities and network bandwidth capacity (at any scale), it becomes imperative to store the source data close to their point of production and only distribute across the network the data relevant to the task at hand.

Unfortunately, existing data management solutions (e.g., relational databases, non-relational databases, data stores, and other data collection techniques) have traditionally required static, pre-defined database structures, rules and schema that are created for the database when the database is established. As such, users requesting the data are limited to data access according to static schema (that may be outdated), from a database whose structure might be inefficient and costly. Additionally, updating the database structure, rules or schema in existing solutions requires re-starting the database from scratch.

Others have put forth efforts towards adaptive database systems. For example, United States issued U.S. Pat. No. 5,983,218 to Syeda-Mahmood is directed to modifying a relevance ranking of databases based query and response patterns for the databases. However, Syeda-Mahmood lacks any discussion of a modification of the databases themselves.

United States pre-grant publication number 2011/0282872 to Oksman, et al ("Oksman") is directed to updating a system to increase the effectiveness of future queries. However, in Oksman, the system's updating is performed based on usage of query results or other feedback to the query results, rather than based on the results themselves. Similarly, United States pre-grant publication number 2012/0296743 to Velipasaouglu, et al ("Velipasaouglu") is directed to updating a database based on a query and a user's activity following a query response.

United States pre-grant publication number 2007/0294266 to Chowdhary, et al ("Chowdhary") is directed to using time-variant data schemas for database management based on database modification requests. However, in Chowdhary, the system simply stores new versions of schema stored along with older versions. Additionally, Chowdhary lacks any discussion regarding using query responses to generate new or updated versions of data schema.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for system that can dynamically adapt the structure, schema and/or metadata of its data archives.

SUMMARY OF THE INVENTION

The inventive subject matter provides apparatus, systems and methods in which responses ("extracts") to requests against a data store are used to update a schema and/or structure of the database.

In some embodiments the data store is an archive of one or more sources of data. Archives might or might not be compressed, and might or might not include all of the data of the archived data sources, and might or might not be have the same structure as the data source(s). The archives can store data at full-fidelity (i.e., a reversible process, a bijection between source data and stored data). Among other things, archives can comprise one or more mirrors of the data source(s), collection(s) of data from the data source(s), as well as data from a sensor or other transient data source that would not otherwise be stored. Archives are typically considered to be write once-read many data stores, although it is contemplated that archives can grow by accruing data from additional data source(s).

Archives are preferably located logically proximate to their data sources, relative to end users, other archives or other intermediary network components.

The schema includes metadata about the archive. Contemplated metadata includes field names, data definitions, data types, access rules, traversal rules, strings used in executing historical extract requests, and statistical data regarding response data priority or other request patterns. Some or all of the metadata can advantageously be derived from requests, responses to the requests and/or processor, memory or other performance in executing the requests.

Embodiments can also include an analysis engine that performs the functions of updating the schema and/or structure of the data store. Contemplated updates include adding to, deleting and modifying the data definitions, data types or other metadata. Other contemplated updates include compressing or re-arranging at least part of the data store. Some or all of the updates to the schema can advantageously be derived from requests, responses to the requests and/or processor, memory or other performance in executing the requests.

Responses from the data store are preferably stored in a response repository, and at least a portion of the response repository can be published on a network, for access by all manner of authorized entities, including for example requesting entities, and analysis engines not closely associated with the data store.

Thus, the inventive subject matter can be used, for example, to provide full-fidelity storage of data while enabling end users to constantly evolving ways to access and explore the data and retrieve what they need in a network-efficient manner.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
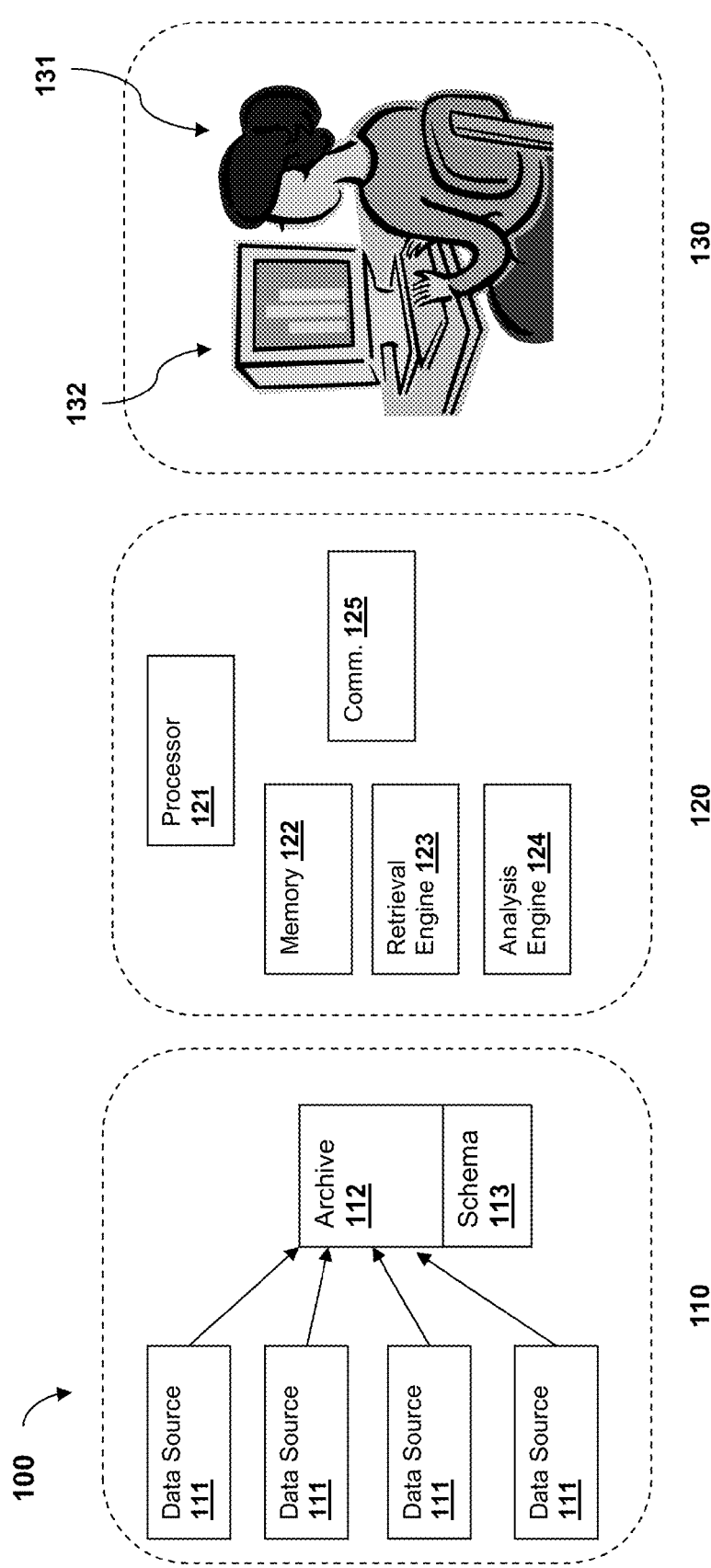
FIG. 1 is a schematic overview of an exemplary system according to the inventive subject matter.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86-based CPU, ARM-based CPU, ColdFire-based CPU, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, data store server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, data stores or interfaces can exchange data using standardized protocols, interfaces and/or algorithms, possibly based on HTTP, HTTPS, AES, public-private key exchanges, web service APIs, known financial transaction protocols, or other electronic information exchanging methods. Examples of data exchange interfaces can include Ethernet, USB, HDMI, Bluetooth, wired, wireless, near-field communication interfaces, etc. Data exchanges can be conducted over a packet-switched network, the Internet, LAN, WAN, VPN, cellular, or other type of packet switched network.

One should appreciate that the disclosed techniques provide many advantageous technical effects including enabling the constant refinement of a data archive to decrease the computational cost of executing data requests against the archive.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networking environment, the terms "coupled to" and "coupled with" are also used euphemistically to mean "communicatively coupled with" where two or more network-enabled devices are able to exchange data over a network with each other, possibly via one or more intermediary devices.

FIG. 1 depicts a system 100 that generally includes a data component 110, a processing and communication component 120 and a requesting component 130.

The data component 100 generally includes at least one data source 111, at least one archive 112 at least initially derived from the at least one data source 111, and at least one schema 113 associated with the at least one archive 112. FIG. 1 illustrates an example whereby a data archive 112 is derived from a plurality of data sources 111, and has one corresponding schema 113. However, it is contemplated that a data archive 112 can have a plurality of associated schema 113. Likewise, it is contemplated that that the data archive 112 can be derived from a single data source 111. Conversely, in the simplest case, there is one data source 111 that is archived at some point in time as a single archive 112, which is associated with a single schema 113.

From the perspective of the data archive 112, data source 111 can be any device from which the data used to create and update the contents of the data archive 112 are received. Thus, generally speaking, data source(s) 111 can include data storage devices (i.e. devices that store data obtained from other sources), data creation devices (i.e., devices that can generate data but do not store it), and combination data storage/generation devices (i.e., devices that can generate data, and store generated and other data). Examples of data source 111 can include sensors (e.g. accelerometers, motion sensors, biometric sensors, temperature sensors, force sensors, impact sensors, flowmeters, GPS and/or other location sensors, pressure sensors, etc.), data storage devices (e.g., server computers, non-transitory computer-computer readable memory components such as hard drives, solid state drives, flash drives, optical storage devices, etc.), computing devices (e.g., desktop computers, laptop computers, tablets, phablets, smartphones, etc.), and user-input devices (e.g., devices that receive data from users, which can include computing devices with user-input interfaces).

Data archive 112 can be considered to be a collection of data obtained from data source(s) 111. The data archive 112 can be embodied via at least one non-transitory computer readable storage medium that is configured to store the data of the data archive. In embodiments, the data in the data archive 112 can be of the same data type as the data of data source(s) 111. In embodiments, the data archive 112 can import schemas, data definitions, and other data properties from the data source(s) 111. In embodiments, the data in the data archive 112 can be in the same format as the source data from source(s) 111 (of the same or different data types).

In embodiments, the data of archive 112 can be a full-fidelity version of the corresponding data from source(s) 111. In these embodiments, a bijection exists between the source data and the archive data, such that the source data in its original form can be reconstructed or regenerated from the corresponding archive data.

In embodiments, the data archive 112 can comprise text data, whereby the data from source(s) 111 is converted to text data for inclusion in data archive 112.

In embodiments, the data archive 112 can be a mirror of the data source(s) 111.

In embodiments, data archive 112 can contain data in the form of attributes and tuples specified in an input schema. The input schema can be considered to be a default schema used in the creation of the archive 112. Thus, the data archive 112 is the primary physical instantiation (data written to storage) of data in the system 100.

In these embodiments, the data archive 112 can be described as a tabular data structure. Attributes are generally synonymous with columns, whereas records or rows are generally synonymous with tuples. A tuple can represent one value for each attribute in an archive relative to an ordered or fixed rank within each attribute. The rank may be relative to an ordering of some or all attributes and can be defined in the input schema. Alternatively, collection of data within the archive 112 can default to a rank based on structure and order of data received.

Generally speaking, the schema 113 can be considered to be the structure of the data archive 112, providing the organization of the data within the data archive 112. A schema 113 can include a definition of fields, data types, record delimiters, classes, relationship between data, compression rules, etc. The schema 113 can include performance metric thresholds for the execution of requests. The performance metric thresholds can be according to sections of data, particular records, request types, etc. The performance metric thresholds can include targets for the execution of requests (e.g., time to completion, processor load, etc.), acceptable tolerances, etc. The thresholds can be dynamically adjusted based on factors such as network capability (overall and/or at a particular point in time), identity of requestor, the frequency of the data being accessed, etc. For example, for data that is frequently accessed, the acceptable performance metric thresholds can be set to be more strict (i.e., only a slight drop in access speed is permissible).

As mentioned above, a data archive 112 can include a default (i.e., input) schema 113 providing an initial structure of the abstract to which initial requests to the archive 112 are applied to generate the initial responses. For example, in an otherwise completely unstructured and otherwise undefined data archive, a default schema can be the designation of record boundaries within the data archive which serve to provide an initial structural organization to the data. These boundaries can be defined a priori by an administrator, or can correspond to known properties of data from source 111. This example is provided for illustrative purposes, and it is contemplated that default schema can include other and/or additional structural definitions, classifications, categorizations, etc. It is also contemplated that the data archive 112 can lack any default schema whatsoever, wherein an initial schema can be constructed via parsing and applying pattern recognition and rule-based algorithms to the data archive 112 by a processor (such as processor 121).

In embodiments, the pattern recognition and rule-based algorithms can be applied to the default schema, thus providing an initial step of evolution to the basic default schema. In an illustrative example, an archive can be created from sensor data, whereby the archive is created based on a simple read of the sensor data. In this example, the sensor data is loaded into an archive in tabular form where a row of values are associated with a timestamp and sensor output (e.g., "Aug. 4, 2014 17:08:35, 75.9, 234.8, . . . "). The initial archive schema can be the known qualities of the sensor data, which in this example is the names associated with the field of the rows—"Date", "Time", "Pump Temperature", "Pump Voltage", etc. Upon applying pattern recognition on multiple roles (preferably tens, hundreds, or even thousands or rows), aspects of the sensor data can be discovered to be periodic in nature. In this example, a voltage variation can be observed as having a baseline and a periodic multi-harmonic signal. Thus, a curve (e.g., a wave) having a mathematical equation can be derived from the voltage data. This default initial schema can be updated to incorporate this discovery (e.g., via a set of parameters for a Fourier transformation (FFT)). Thus, a new set of operators can be applied to the data in processing user requests that were previously unknown. When users access data, they can request data associated with the harmonic signal part of the voltage data, whereby the processing component can use this updated schema to perform the operations necessary to remove the baseline voltage data from the generated responses, when the field is referenced in future requests. However, the underlying voltage data in the archive is not modified or transformed at the physical/persistent level.

The schema 113 can include metadata associated with the archive 112, such as system metadata and archive metadata. System metadata contains system configuration, performance, and consistency information that is both created and updated. This metadata can be published and shared with other systems. For example, metadata structure shared with other systems (i.e., nodes in the larger ecosystem made up of a plurality of systems of the inventive subject matter) can be updated to record the creation of a new archive through a messaging service. Archive metadata contains statistical observations and indices calculated during storage engine operations including compression and write. This metadata can be updated along with other aspects of schema 113.

The processing and communication component 120 generally includes at least one processing component 121, memory 122, a retrieval engine 123, an analysis engine 124, and a communication component 125.

The processing component 121 can be one or more computer processors that execute instructions to carry out functions and processes associated with the inventive subject matter.

The retrieval engine 123 performs the functions associated with obtaining data from the data archive 112 in response to the extract request received from a requestor, and providing the data in the form of a response back to the requestor, described in further detail herein. The analysis engine 124 performs the functions associated with modifying the schema 113 and/or the archive 112 based on the response, the schema 113 and, in embodiments, the request. The functions and processes executed by analysis engine 124 are described in further detail herein.

In embodiments, the retrieval engine 123 and analysis engine 124 can each comprise set of computer-executable instructions that are executed by processing component 121 to carry out their respective functions. In these embodiments, the retrieval engine 123 and analysis engine 124 can be a single engine having the functions of both or be separate engines, and can be stored in either the same or separate non-transitory computer-readable media and can be executed by the same or different processing component(s) 121.

Communication component 125 can include any communication interface enabling the processing component 120 to exchange data with the user interface 132, via one or more data exchange networks, examples of which include the data exchange interfaces, protocols and/or networks discussed herein.

The requesting component 130 generally includes at least one requesting entity 131 and at least one interface 132. The requesting entity 131 can be considered to be the entity that initiates the request for data from archive 120, via the interface 320. The requesting entity 131 can be a single user (as illustrated in the example of FIG. 1), a group of users, an organization, an enterprise, etc.

User interface 132 is an interface via which a requesting entity 131 can submit requests to access data contained in data archive 112. The user interface 132 is presented to the user via a computing device, through which the user can create the requests. The user interface 132 can be a web-based interface hosted by an administrator of data archive 112, accessible via an internet browser on the computing device, an application executed on a requesting entity's 131 computing device, etc. As used herein, the term "user interface" can be considered to refer to the software application as well as the computing device used to present the interface to the user and that enables the user to create requests.

As used herein, the term "requestor" is used to refer to the interface 132 as the origin of the request, created according to the requesting entity 131. Thus, the term "requestor" may or may not include requesting entity 131 but always includes the interface 132.

As illustrated in FIG. 1, the groupings of system components into the data component 110, the processing and communication component 120, and the requesting component 130 are provided for illustrative purposes according to the various functions of the system components according to aspects of the inventive subject matter. Thus, the illustrated "grouping components" 110,120,130 are not intended to limit or define the contemplated physical embodiments of the system 100.

In embodiments, the data archive 112 is at relatively close data proximity from one or more of the data source(s) 111, as compared to the requesting component 130. The term "data proximity" is intended to refer to the relative difficulty in transmitting data from a sender to a recipient, which can be influenced by factors such as physical proximity, size of data being transmitted, network capacity between the sender and receiver, number of intermediary nodes between the sender and receiver, and other factors. Thus, in these embodiments, the data archive 112 is communicatively coupled to the data sources 111 in such a way that the exchange of data from the data source(s) 111 to the data archive 112 is significantly faster than the exchange between data archive 112 and requesting component 130. This can be due to factors such as the data archive 112 being in closer physical proximity to the data source(s) 111 than to requesting component 130, that the network capacity between the archive 112 and data sources 111 is greater than that of the network between archive 112 and requesting component 130 (e.g., greater bandwidth, better-optimized network connection, etc., less intermediary nodes slowing down data exchange, fewer bottlenecks, etc.), the size of information sent by individual data sources 111 to archive 112 is smaller than the sending of all of the archive 112 to the requesting components, etc., or a combination of these factors.

The system 100 can also include an operator interface (not shown) that allows an operator (e.g., a system administrator or other personnel having control over the data archive) to perform administrative and other service-related functions over the various aspects of the system. The operator interface can include one or more computing devices communicatively coupled to various components of the system 100. An operator can use operator interface to oversee the creation and loading of data into a data archive 112, manage archive resources and computing environment, manage access control and security functions, etc. For example, an operator can trigger a manual alteration the nature of the fidelity of the data archive (potentially losing information). This alteration can be applied on an archive history basis, and is irreversible. However, the operator may elect to do so to conserve storage space when faced with storage constraint issues.

Figure 2:
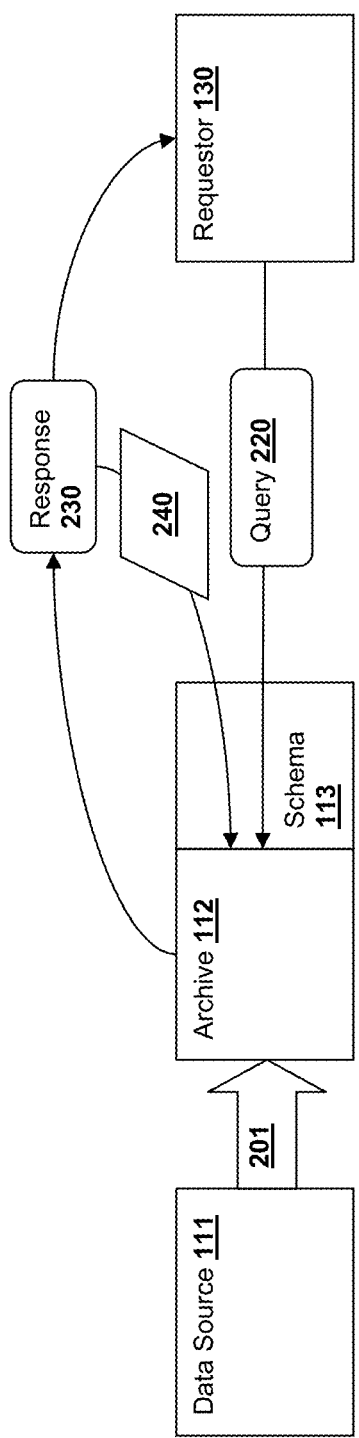
FIG. 2 is an overview of the information flow diagram within the exemplary system.

FIG. 2 provides an overview of the data flow processes of system 100, according to aspects of the inventive subject matter.

As shown in FIG. 2, the data archive 112 is initially created from data source 111, illustrated via arrow 210. An extract request 220 to access data is generated by requestor 130 and transmitted to processing component 120. Processing component 120 receives the extract request 220 via communication component 125.

Figure 3:
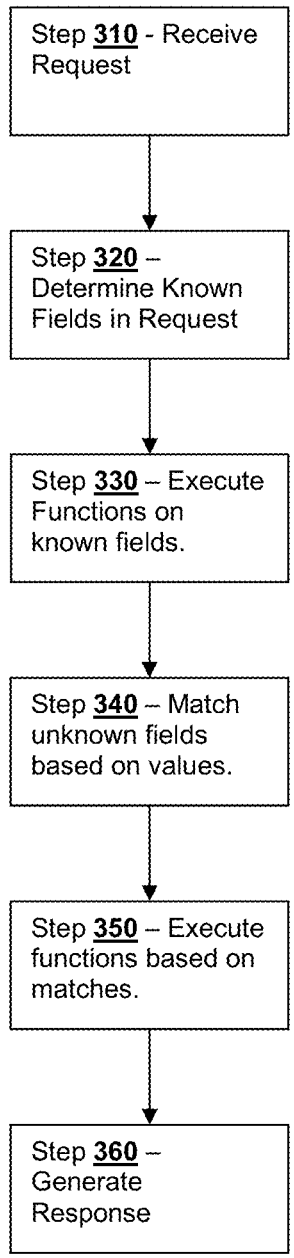
FIG. 3 is a flow diagram of the execution of processes and functions of the retrieval engine.

Retrieval engine 123 executes the received extract request 220 against data archive 112 according to the schema 113. Once the extract request 220 has been executed, the retrieval engine 123 assembles the results in the form of response 230 (also referred to as extract response 230). Once the response 230 has been generated, it is transmitted back to the requestor 130. FIG. 3 is a flow chart of the processes executed by retrieval engine 123 in greater detail.

Figure 4:
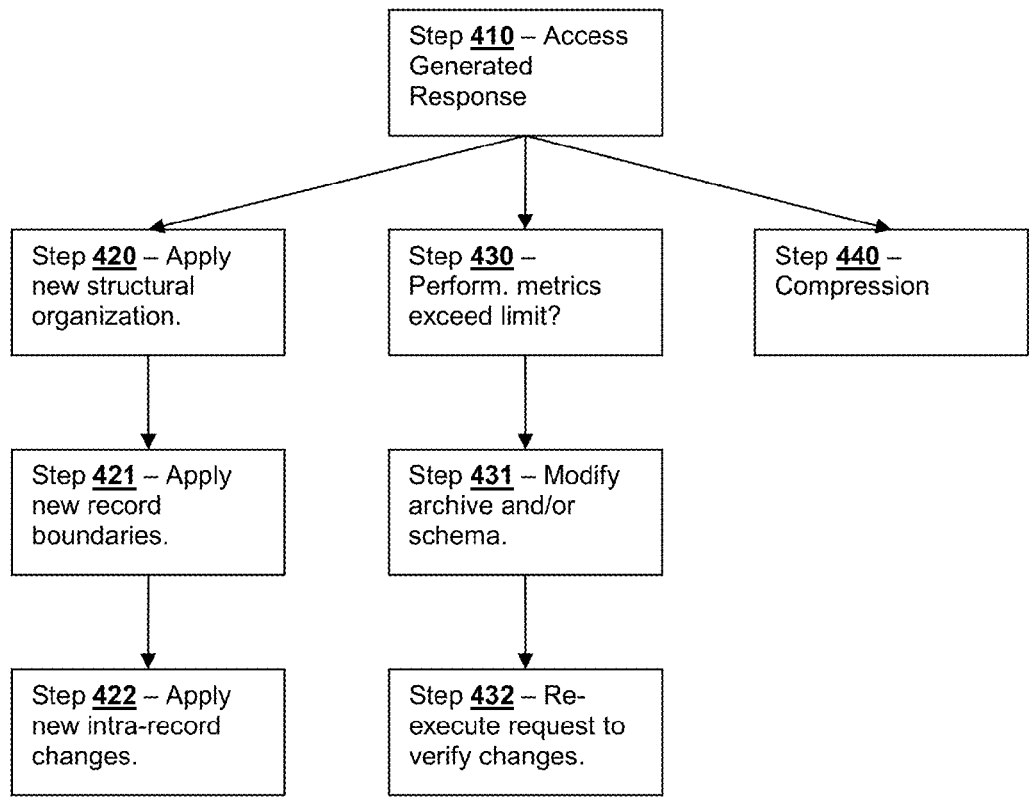
FIG. 4 is a flow diagram of the execution of processes and functions of the analysis engine.

Once the response 230 has been generated, analysis engine 124 analyzes the response 230 and performs an update 240 to at least one of (a) the schema 130 associated with the archive 112 and (b) the structure of the data archive 112 itself based on the response 230. FIG. 4 illustrates data flow processes associated with an analysis engine 124 in greater detail.

As shown in FIG. 3, retrieval engine 123 receives the request 220 at step 310. At step 320, the retrieval engine 123 applies the request 220 to the schema 113 to determine the extent to which the information sought in the request 220 is defined by fields or other structural organizational scheme within archive 112. In embodiments, the retrieval engine 123 can include data access control functions whereby credentials of requestor 130 are verified prior to allowing any access to the archive 112. The access control functions can include verification of the identity of the requesting entity 131, verification a network address, authentication procedures (e.g., passwords, encryption schemes, certificates from an authority, etc.), role-based authentication/verification (e.g., a role within an organization, etc.), and other forms of access control.

In embodiments, the request 220 can be formatted to include all of the fields (or other structural categorization) sought in the data request. For example, the request 220 can include one or more extract request parameters in the format "field name=field value". Thus, the retrieval engine 123 matches each of the field names in the extract request parameters with the field names defined by the schema 113 for the archive 112. Other extract request parameters can include data type, data size, length, etc. Extract request parameters can also be combinations of single parameters. For example, in the "field name=field value" example, the request 220 can also specify that the "field value" be of a certain data type (e.g. string, integer, etc.), have a certain maximum or minimum length, etc.

In embodiments, the request 220 can be formatted according to a natural language question, in which case the processing component 120 can include a semantic database to determine that the request 220 is focusing on a particular set of fields, and then compare the fields derived from the request 220 against the defined fields according to schema 130.

At step 330 the retrieval engine 123 executes the operations associated with carrying out the request 220 according to the field values of the defined fields of the schema 113, such as filtering the records of the archive 112 such that the output of the operation is those records matching the field values of the defined fields.

It should be noted that a request 220 can include a request for data whose field (in this example), data type, data format, data definition or other organizational/structural parameter is not defined or otherwise known in the data archive 112 according to the schema 130. For these unknown fields, the matching performed at step 320 with known/defined fields as set forth in the schema 113 will fail to produce a match, and can be flagged or otherwise identified by the retrieval engine 123 as unknown fields. At step 340, the retrieval engine 123 executes a matching of the "field value" of extract request parameter with the archive 112 to determine whether the field value corresponds to any part of any record within the archive 112. The match can be a literal (i.e., exact) match or can be a proximity match (i.e., matching within a defined percentage of similarity).

In embodiments, any matches can be analyzed to infer other characteristics of the matched data. For example, for every match of a field value, the retrieval engine 123 can determine the data type of the field value (e.g., that the match is a string, integer, etc.).

At step 350, the retrieval engine 123 performs the operations on the archive 112 (e.g., filtered or otherwise processed) according to these matches to return the data output used in generating the response 230.

As illustrated in FIG. 3, step 340 is executed after the processes of step 330 are executed. Thus, the matching of the field value of the extract request parameter of the unknown field is limited to those records returned from the filter processes performed with the defined fields of archive 112. However, in embodiments, step 340 can be executed prior to step 330, whereby the matching of the values of unknown fields can be performed against all of the data within the archive 112. Therefore, steps 330 and 350 of these embodiments are effectively combined.

At step 360, the response 230 is generated based on the output of the execution of the extract request, and provided back to requestor 113.

The response 230 can be considered to be a view of the archive 112 presented to the requesting entity 131 via the user interface 132. In embodiments, the response 230 can be a set of scalar expressions (e.g., scaling and compare expressions, etc.) that define the set of data in the archive (or a projection/subset thereof) that correspond to the data requested by the requestor 130.

In embodiments, the set of scalar expressions can include clauses that describe the Projection, Function and Filter type. A Projection can be considered as a selection of a sub-set of data (such as a subset of columns of all available columns, if the archive is so structured). The Projection can also be used to modify an attribute's value. The Function can be a modification of attributes within the projection. Examples can include scalar mathematical functions such as addition and subtraction. The Filter can conditionally restrict tuples within the defined Projection. In embodiments, the Function can be applied to either a Filter or a Projection.

The following are examples of a request 220 executed on data archives 112 having different levels of schema definition, according to the process described in FIG. 3. The request 220 in this example is seeking data associated with males aged 35-40 years old, living in the city of Orange, Calif. Thus, the request 220 is considered to include the following "field=value" parameters: 'gender'='male', 'age'='35-40', and 'city'='Orange'.

Example 1

The extract request 220 is applied to a data archive 112 having established, known data fields for all of the extract request parameters (gender'='male', 'age'='35-40', and 'city'='Orange') of the request 220. For each record in the archive 112, there are defined fields corresponding to "gender", "age" and "city". Correspondingly, the extract request 220 is formatted according to these known fields of archive 112. Thus, the retrieval engine 123 executes the extract request 220 and filters the data in the archive 112 according to the gender, age, and city fields. In this example, there are no "unknown" fields in the request 220, so steps 340 and 350 of FIG. 3 are not executed. This result is then used to generate response 230 at step 360.

Example 2

The same request 220 from Example 1 is applied to a "less established" archive 112 (i.e., the schema 113 is less established), where some, but not all, of the fields corresponding to the parameters in the request 220 are known/defined in the archive 112. In this example, the schema 113 includes defined "gender" and "age" fields, but does not have a defined "city" field for archive 112. Having determined the defined fields at step 302 and executed the functions according to those defined fields at step 330, the retrieval engine 123 executes step 340 and searches within the results of step 330 for the literal match "Orange" (in this example, a literal match is preferred because the city name will not have a plural or other conjugation). Once the matches are obtained, the processes of step 350 are executed and the response generated at step 360. In the embodiments whereby step 340 is executed prior to step 330 as described above, the retrieval engine 123 performs match of "Orange" against the entire archive 112.

Example 3

In this example, the request 220 is applied to an even less "established" archive 112 (i.e., having an even less established schema 113), where none of the field names are known, such that none of the fields contained in the request 220 will match with corresponding fields of archive 112. In this example, the schema 113 can include other defined fields (but none that match the request 220's fields), or can have no defined fields of any kind Thus, the only "knowns" are the record boundaries defined by the schema 130. In this case, the execution of step 320 will not return any defined fields. Thus, the retrieval engine 123 executes the matching of step 340 for literal match for "male", a literal integer match of "35-40" (and can include matches of each integer 35, 36, 37, 38, 39, 40), and the literal match of "Orange".

Example #4

This example is similar to Example 3, but the record boundaries are also not "known". As defined herein, a record boundary indicates a beginning and an end of each record (e.g., a row in a spreadsheet, etc.). In other words, the data archives only has one dimension (e.g., flat) including a long single string of data. In this example, the retrieval engine 123 searches the entire archive 112 for matches of the field values in the request 220. Based on the matches, the retrieval engine 123 can infer record boundaries accordingly by performing pattern analysis on the matched results (e.g., periodicity of repeating matches, and the distance between the repeating matches, taking into account that not all field values will match in all records, etc.).

Having inferred the record boundaries, an offset can be determined for each match from what are inferred to be separate records, to account for possible different field value lengths among a same field type, class of literals (e.g., male, male, female, male), or data type (e.g., integer, floating point, etc.). For example, "male" may return matches that in fact are for "female". However, because a match of "male" within "female" will have an offset of two corresponding to the "f" and "e" characters, these results can be eliminated as false positives for the purposes of generating the response 230.

In embodiments, the record boundaries inference can be executed by the retrieval engine 123 even if record boundaries/delimiters exist within archive 112, such that corrections and adjustments to previously determined record boundaries can be performed over time as the archive 112 is accessed by additional requesters and additional responses are provided thereto.

FIG. 4 illustrates data flow processes associated with an analysis engine 124, whereby the analysis engine 124 uses the response 230 to modify the schema 113 and/or the structure of the archive 112 itself. The functions and processes of FIG. 4 can be considered collectively to be the functions and processes available to the system to perform one or more updates 240 of FIG. 2.

At step 410, the analysis engine 124 accesses the generated response 230 and any additional corresponding data (if not included within the response 230 itself). The use of "accessing" the generated response 230 is intended to refer generally to the logical step that the generated response 230 becomes available to the analysis engine 124 for the purposes of carrying out its associated functions. As such, the analysis engine 124 can also be considered to be "receiving" the generated response 230. For example, the generated response 230 can be accessed by the analysis engine 124 prior to transmission as a logical step following step 360, constituting a logical "hand-off" of the response 230 from the retrieval engine 123 to the analysis engine 124. In another example, a copy of the generated response 230 is generated by the retrieval engine 123 and provided to the analysis engine 124 such that the functions of the analysis engine 124 can be performed chronologically independent of the actual transmission of the response 230. In another example, in embodiments where the retrieval engine 123 and analysis engine 124 are part of a single engine, "accessing" can refer to the invocation of the functions associated within the analysis engine 124 and applied to the response 230 (or a copy thereof).

The response 230 generated at step 360 of FIG. 3 can include performance metrics associated with the retrieval of the requested data and the generation of the response 230. Performance metrics can include a time to complete the request, a resource load indication (e.g., processor usage, energy usage, memory usage, etc.), and other performance metrics. In embodiments, the performance metrics are a part of the response 230 that is provided to the requestor 130. In embodiments, the performance metrics are generated at step 360 along with, but are separate from, the response 230. In these embodiments, the performance metrics can be provided to the analysis engine 124 along with the response 230 without also having to provide the performance metrics to the requestor 130.

At step 420, the analysis engine 124 modifies the archive 112 and schema 113 according to any new archive structure component (e.g., new record, field, data type, delimiter, etc.) reflected in the response 230. Step 420 can be executed according to steps 421-422.

At step 421, the analysis engine 124 applies any new record delimiters to the schema 113 based on the location of the record delimiters inferred by the retrieval engine 123 (such as in Example 4 above).

The modifications to schema 113 can include data the location data within the archive 112 of the created record delimiters. Additional updates to the schema 113 can include a determination on the sizes of newly established records. Modifications to the archive 112 itself can include insertion of record delimiters or other record boundaries at the corresponding locations according to the updated schema 113, as well as modifying the newly established records for consistency with a desired record structure (e.g. inserting or removing spaces, lines, etc. to organize the records within the archive 112). If record delimiters already exist in archive 112, or do not require adjustment, the analysis engine 124 can skip step 421.

At step 422, the analysis engine 124 applies any new fields, data types, data definitions, or other intra-record structural parameters/definitions to the schema 113. This can include the determined locations within corresponding records and/or the overall archive 112 and any correlations with other structural parameters (e.g., a particular field name also has values of a particular data type). As with the record delimiters, intra-record structural delimiters can similarly be applied to the archive 112 itself.

Thus, in Example 2 discussed above, the schema 113 is updated to include a "city" field name, at the appropriate locations within the archive 112, which can be an established offset from the record boundaries for each record. This then aligns data in records as corresponding to a "city" field, even in records that did not contain the "Orange" match. Additionally, if the schema 113 has been updated to include that a correlation of a "city" field as having values of a "string" or "text" type, the analysis engine 124 can analyze the non-matched records to verify that the same data type exists in those records, and the size of the records. The analysis engine 124 can then update rules associated with the expected (or permitted, maximum, or minimums, etc.) size of field values for cities within the schema 113.

In embodiments, the modifications to the archive 112 can be performed by the analysis engine 124 as soon as the modifications to the schema 113 are performed. In other embodiments, the modifications to the archive 112 are applied only when a subsequent request 220 from a requester 130 (either the same requestor or a different one) is executed. Thus, the archive 112 itself is only modified with the delimiters and other modifications at run-time.

In addition to the schema modifications discussed above, modifications to the schema 113 can include updating the schema 113 to reflect observed characteristics of the archive 112 as a whole. Examples of these characteristics can include recognitions of periodicity, decay, etc., such as the example of the sensor data illustrated above.

Preferably, requestors can only perform extraction actions against the archive (i.e., requests for access to data and receive responses). While the archive and/or the schema can be modified based on the response provided to the requestor, a requestor cannot directly modify the archive data itself. However, to allow requestors to narrow or filter data presented via a response, requestors can mark (e.g. via annotations, flags, etc.) data at any granularity and maintain those markings for any length of time. The markings can be used by the system to keep track of data not deemed relevant in the temporal semantic view of the archive as seen by the requestor. In embodiments, the markings can be reintroduced into the system by interpreting them as new requests, which can be constructed onto the extracted response or as a new request combining the prior request and the "marking" request.

In embodiments, certain modifications to the archive 112 can be labeled as "provisional" modifications within schema 113, such that they are considered preliminary or subject to further modification. Provisional modifications can include modifications that have been recently created (e.g., within a certain number of requests processed against the archive 112). After provisional modifications have withstood a predetermined number of requests and responses processed against the archive 112, those modifications can be made permanent (i.e., serving to confirm that the fields, data definitions, types, record boundaries, etc. are valid).

At step 430, the analysis engine 124 analyzes performance metrics of response 230 against the performance metrics thresholds of the schema 113. If the performance metrics of the response 230 exceed or otherwise fall outside of desirable or acceptable thresholds as indicated by schema 113, the analysis engine 124 can execute changes to the data archive 112 to reduce the computational cost or load to execute requests on similar data in the future at step 431. For example, the analysis engine 124 can move records within the archive 112 such that the records are in a location within the archive 112 that is more quickly accessed during the execution of a retrieval process. In another example, the analysis engine 124 can modify the schema 113 such that the filter order among several fields is optimized.

In embodiments, the request 220 can be re-executed by the retrieval engine 123 (at step 432) after the changes of step 431 are implemented, and the new performance metrics compared against the performance metrics of the response 230 to verify that the performance of executing the extract request has improved.

At step 440, the analysis engine 124 can compress sections of data within the archive 112. For example, sections of data that remain unknown (either within records our between records) can be compressed. In another example, defined sections of data (of a particular field type, data type, data definition, etc.) can be compressed to take advantage of commonalities and redundancies.

In FIG. 4, the processes 420-422, 430-432 and 440 executed by analysis engine 124 are shown in parallel to show that they can be executed concurrently by the analysis engine 124. However, it is contemplated that the processes can be executed in series in the numerical order of the elements described in FIG. 4, or in other sequential orders. Additionally, the extent to which the archive 112 and/or the schema 113 can be modified performed via the processes shown in FIG. 4 can be governed by priority rules. For example, a reorganization of a record within the archive 112 such as in step 431 may be limited or outright rejected if superseded by a higher-priority rule (such as the movement of the record pushes other records "down" that are frequently requested by users and thus, must be maintained at the "top" of the accessibility list).

It is contemplated that the modifications to the archive 112 and schema 113 described in FIG. 4 can also be enacted based on a collection of historical responses generated in response to historical extract requests submitted by one or more requestors in the past. Additionally, the response 230 can be added to the collection of historical responses. Metadata of schema 113 can statistical data and analysis including request patterns (e.g. from which requesters, how frequently, which data has been accessed, etc.). As such, the analysis engine 124 can establish and update data access priorities for certain sections of data within the schema 113. Historical responses, requests, and other data can be stored in a response repository, which can be memory 122 of component 120, the same storage as the archive 112, or another, separate non-transitory computer-readable medium.

In embodiments, the analysis engine 124 can also modify the archive 112 and/or the schema 113 based in part on the received request 220. Similarly, where historical responses are used to shape the archive 112 and schema 113, so can historical requests be used.

In embodiments, system 100 will be a part of a larger ecosystem having other, similar systems with corresponding archives generated based on corresponding data sources. In these embodiments, the system 100 can also include a publication module that can publish the existence of the archive 112 to other systems in the ecosystem. It is further contemplated that the schema 113, metadata within the schema 113, and other characteristics of the archive 112 can be published. Similarly, the response repository (which may or may not include a collection of requests), can be published via the publication module.

In embodiments, the response 230 can be a data stream. In these embodiments, the steps of FIG. 4 can be applied as the data stream is occurring, based on data being transferred as needed during the stream. For example, the analysis engine 124 can modify the archive 112 and/or schema 113 based on the response cost during the data stream. For data streams, the modifications to the archive 112 and/or schema 113 can be transitory for the duration of the stream so as to provide the immediate benefit of the modifications. In embodiments, these modifications can also be made permanent as described herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system comprising:
    a data archive stored in a non-transitory computer readable storage medium;
    a schema that provides metadata that defines one or more known request parameters that are established for the data archive;
    a retrieval engine executed by a processor configured to:
        receive an extract request from a requestor;
        identify (i) at least one known extract parameter of the extract request as being among the one or more known request parameters that are established by the schema for the data archive, and (ii) one or more unknown extract parameters of the extract request as not being among the one or more known request parameters that are established by the schema for the data archive;
        generate, in response to the extract request, an extract response from the data archive using (i) the at least one known extract parameter of the extract request that is identified as being among the one or more known request parameters that are established by the schema for the data archive, and (ii) the one or more unknown extract parameters of the extract request that are identified as not being among the one or more known request parameters that are established by the schema for the data archive; and
        provide the extract response to the requestor, in response to the extract request; and
    an analysis engine configured to analyze the extract response to automatically update a structure of the data archive and to define the one or more unknown extract parameters of the extract request as one or more new, known request parameters that are established by the schema for the data archive.

2. The system of claim 1, wherein the analysis engine is further configured to update at least one of the schema and the data archive based at least in part on historical extract responses.

3. The system of claim 2, wherein the updating the data archive comprises compressing at least a portion of the data archive.

4. The system of claim 1, wherein the analysis engine is further configured to analyze the extract response to update the schema, and wherein the metadata comprises at least one of field names, data definitions, data types, access rules, traversal rules, strings used in executing historical extract requests.

5. The system of claim 1, wherein the metadata comprises information about the data archive derived from the processor performance in executing historical extract requests.

6. The system of claim 1, wherein the analysis engine is further configured to use the extract response to update the schema to identify at least one of a data type and a data definition of a portion of the data archive.

7. The system of claim 1, wherein the data archive comprises a mirror of a data source.

8. The system of claim 1, wherein the analysis engine is further configured to:
store the extract response in a response repository; and
publish at least a portion of the response repository on a network.

9. A method for use by a system having a processor and a non-transitory computer readable storage medium storing a data archive and a schema providing metadata associated with the data archive, the method comprising:
receiving, using the processor, an extract request from a requestor;
identifying (i) at least one known extract parameter of the extract request as being among one or more known request parameters that are established by the schema for the data archive, and (ii) one or more unknown extract parameters of the extract request as not being among the one or more known request parameters that are established by the schema for the data archive;
generating, by the processor executing a retrieval engine, in response to the extract request, an extract response from the data archive using (i) the at least one known extract parameter of the extract request that is identified as being among the known request parameters that are established by the schema for the data archive, and (ii) the one or more unknown extract parameters of the extract request that are identified as not being among the one or more known request parameters that are established by the schema for the data archive;
providing the extract response to the requestor, in response to the extract request; and
automatically updating a structure of the data archive and defining the one or more unknown extract parameters of the extract request as one or more new, known request parameters that are established by the schema for the data archive, based on an analysis of the extract response by the processor executing an analysis engine.

10. The method of claim 9 further comprising:
automatically updating at least one of the schema and the data archive based at least in part on an analysis of historical extract responses.

11. The method of claim 10, wherein the automatically updating of the data archive comprises compressing at least a portion of the data archive.

12. The method of claim 9 further comprising:
automatically updating the schema based on the analysis of the extract response;
wherein the metadata comprises at least one of field names, data definitions, data types, access rules, traversal rules, strings used in executing historical extract requests.

13. The method of claim 9, wherein the metadata comprises information about the data archive derived from the processor performance in executing historical extract requests.

14. The method of claim 9 further comprising:
using the extract response to update the schema to identify at least one of a data type and a data definition of a portion of the data archive.

15. The method of claim 9, wherein the data archive comprises a mirror of a data source.

16. The method of claim 9 further comprising:
storing the extract response in a response repository; and
publishing at least a portion of the response repository on a network.

17. A system comprising:
a data archive stored in a non-transitory computer readable storage medium;
a schema having metadata associated with the data archive;
a retrieval engine executed by a processor configured to:
identify (i) at least one known extract parameters of an extract request as being among one or more known request parameters that are established by the schema for the data archive, and (ii) one or more unknown extract parameters of the extract request as not being among the one or more known request parameters that are established by the schema for the data archive;
generate, in response to the extract request, an extract response from the data archive using (i) the at least one known extract parameter of the extract request that is identified as being among the one or more known request parameters that are established by the schema for the data archive, and (ii) the one or more unknown extract parameters of the extract request that are identified as not being among the one or more known request parameters that are established by the schema for the data archive; and
provide the extract response to the requestor, in response to the extract request; and
an analysis engine configured to use the extract response to automatically update (a) the schema to define the one or more unknown extract parameters of the extract request as one or more new, known request parameters that are established by the schema for the data archive, and (b) a structure of the data archive.

18. The system of claim 17, wherein the analysis engine is configured to further use the extract request to automatically update (a) the schema and (b) the structure of the data archive.

19. The system of claim 17, wherein the analysis engine is further configured to use the extract response to update the schema to identify at least one of a data type and a data definition of a portion of the data archive.

* * * * *

UNITED STATES PATENT AND TRADEMARK OFFICE
CERTIFICATE OF CORRECTION

PATENT NO. : 9,864,764 B2
APPLICATION NO. : 14/473851
DATED : January 9, 2018
INVENTOR(S) : Eric Justin Kraemer and Eric Tristan Lemoine It is certified that error appears in the above-identified patent and that said Letters Patent is hereby corrected as shown below:

In the Claims

In Claim 17, Column 18, Line 26, delete "parameters" and insert -- parameter --, therefor.

Signed and Sealed this
Fifth Day of June, 2018

Andrei Iancu
*Director of the United States Patent and Trademark Office*